United States Patent
Karlsson et al.

(10) Patent No.: US 9,961,644 B2
(45) Date of Patent: May 1, 2018

(54) FAST FADING POWER RESTRICTION

(71) Applicant: Telefonaktiebolaget L M Ericsson (publ), Stockholm (SE)

(72) Inventors: Patrik Karlsson, Sollentuna (SE); Billy Hogan, Sollentuna (SE); Waikwok Kwong, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 199 days.

(21) Appl. No.: 14/760,584

(22) PCT Filed: Jan. 20, 2014

(86) PCT No.: PCT/SE2014/050057
§ 371 (c)(1),
(2) Date: Jul. 13, 2015

(87) PCT Pub. No.: WO2014/112942
PCT Pub. Date: Jul. 24, 2014

(65) Prior Publication Data
US 2015/0358921 A1 Dec. 10, 2015

Related U.S. Application Data

(60) Provisional application No. 61/753,972, filed on Jan. 18, 2013.

(51) Int. Cl.
*H04W 52/24* (2009.01)
*H04W 52/12* (2009.01)
(Continued)

(52) U.S. Cl.
CPC .......... *H04W 52/12* (2013.01); *H04L 5/0073* (2013.01); *H04W 52/146* (2013.01);
(Continued)

(58) Field of Classification Search
CPC . H04W 52/243; H04W 52/12; H04W 52/146; H04W 52/225; H04W 52/267; H04W 72/048
See application file for complete search history.

(56) References Cited

U.S. PATENT DOCUMENTS 5,872,775 A * 2/1999 Saints ................. H04L 1/08
370/342
5,960,039 A * 9/1999 Martin ................ H04B 7/0848
375/267
(Continued)

OTHER PUBLICATIONS

Vodafone Group. "Introduction of a minimum bit rate to the SAE bearer concept." 3GPP TSG SA WG2#55, S2-063905, Seoul, Korea, Oct. 23-27, 2006, pp. 1-4.
(Continued)

*Primary Examiner* — Edan Orgad
*Assistant Examiner* — Nourali Mansoury
(74) *Attorney, Agent, or Firm* — Sage Patent Group

(57) ABSTRACT

The present application discloses methods and apparatus for modifying a normal link adaptation process of a wireless device (200). The normal link adaptation process may be used to compensate for a fast fading dip detected by a base station (100). The present application teaches that the normal fast fading compensation may cause inter-cell interference and degrade system performance. The present application discloses imposing a fast fading restriction or limitation on the normal fast fading compensation can reduce inter-cell interference, improve system capacity, and extends the battery life of the wireless device.

15 Claims, 6 Drawing Sheets

(51) Int. Cl.
    *H04W 52/26*     (2009.01)
    *H04W 72/04*     (2009.01)
    *H04L 5/00*     (2006.01)
    *H04W 52/14*     (2009.01)
    *H04W 52/22*     (2009.01)
    *H04W 52/32*     (2009.01)
    *H04W 52/36*     (2009.01)

(52) U.S. Cl.
    CPC ....... *H04W 52/225* (2013.01); *H04W 52/243* (2013.01); *H04W 52/267* (2013.01); *H04W 72/048* (2013.01); *H04W 52/325* (2013.01); *H04W 52/367* (2013.01)

(56) References Cited

U.S. PATENT DOCUMENTS

| | | | |
|---|---|---|---|
| 8,594,719 B2 * | 11/2013 | Chang | H04W 52/243 |
| | | | 455/522 |
| 8,971,814 B2 * | 3/2015 | Morita | H04W 52/244 |
| | | | 455/552.1 |
| 2004/0110477 A1 | 6/2004 | Nishimura et al. | |
| 2004/0202136 A1 | 10/2004 | Attar et al. | |
| 2006/0019672 A1 * | 1/2006 | Kolding | H04W 52/34 |
| | | | 455/452.2 |
| 2010/0273518 A1 * | 10/2010 | Suzuki | H04W 52/225 |
| | | | 455/522 |
| 2011/0250927 A1 * | 10/2011 | Nakada | H04W 52/50 |
| | | | 455/525 |
| 2013/0003580 A1 * | 1/2013 | Kovacs | H04W 72/082 |
| | | | 370/252 |
| 2013/0077522 A1 * | 3/2013 | Iyama | H04W 52/225 |
| | | | 370/252 |
| 2014/0334500 A1 * | 11/2014 | Kolze | H04W 52/225 |
| | | | 370/431 |
| 2015/0365906 A1 * | 12/2015 | Vargantwar | H04W 52/60 |
| | | | 370/252 |

OTHER PUBLICATIONS

3rd Generation Partnership Project, "3rd Generation Partnership Project; Technical Specification Group Radio Access Network; Feasibility study on uplink enhancements for UTRA TDD; (Release 6)", Technical Report, 3GPP TR 25.804 V6.1.0, Mar. 1, 2006, pp. 1-79, 3GPP, France.

* cited by examiner

FAST FADING POWER RESTRICTION

TECHNICAL FIELD

The present application relates generally to enhancement of system performance in a wireless network and, more specifically, to reduction of inter-cell interference in a wireless network to optimize system capacity.

BACKGROUND

Power control is used on the uplink link in a wireless communication system to control the power of signals received at each base station from the wireless devices. As a wireless device moves within the network, the channel conditions change continuously due to fast and slow fading, shadowing, number of users, external interference, and other factors. Closed loop power control algorithms dynamically control the transmit power of the wireless device on the uplink link. Closed loop power control includes inner loop and outer loop power control mechanism. For inner loop power control, the base station measures the SIR of the received signal, compares the measured SIR to a SIR target, and adjusts the transmit power of the wireless device depending on the comparison. Outer loop power control adjusts the SIR target for the inner loop power control mechanism to maintain desired performance criteria, such as a desired Frame Error Rate (FER).

The inner loop power control mechanism provides improved performance for fast fading channels. Typically, in inner loop power control, the base station can send as many as 1500 up/down power control commands per second to the wireless device. The use of up/down power control commands keeps the received power level constant at the base station. When the received power level at the base station remains stable, the number of re-transmissions by the wireless device due to transmission errors can be maintained, e.g., below a threshold. Power control can also reduce intra-cell interference between uplink transmissions.

One problem with power control is that when fast fading occurs, the power of the wireless device may be increased many decibels (dBs) to compensate the path loss due to fast fading. The increase may be as large as 30 dBs. Because the fast fading loss to different cells has low correlation, a large increase of transmit power by the wireless device to maintain the signal level at the serving base station may result in significant interference with neighboring cells.

Therefore, the conventional method of increasing a wireless device's uplink transmit power to compensate for fast fading leads to strong inter-cell interference. The affected neighboring cells may need to combat the interference with additional resources. Improved methods and apparatus are needed for efficient utilization of resources and improved system capacity.

SUMMARY

The present application discloses methods and apparatus for improving a normal link adaptation process. The normal link adaptation process may be used to compensate for fast fading dips.

In some embodiments, a method for modifying a link adaptation process is disclosed. The method is implemented at a wireless device and modifies a link adaptation process that is used for uplink transmissions from the wireless device. During a normal link adaption process, the wireless device receives one or more transmission parameters from a base station. Based on the one or more received transmission parameters, the wireless device determines a slot transmit power that is used for transmitting a radio signal on a radio channel. The wireless device also calculates an average transmit power and compares the average transmit power to the slot transmit power. Based on the comparison, the wireless device derives a transmission parameter. The wireless device then transmits a data packet in accordance with the derived transmission parameter.

In some embodiments, a wireless device configured to modify a link adaptation process is disclosed. The wireless device comprises a transceiver and a processing circuit. The transceiver is configured to receive and transmit signals. The processing circuit is configured to modify the link adaption process. The processing circuit is configured to determine a slot transmit power for transmitting a radio signal on a radio channel and calculate an average transmit power. The processing circuit is further configured to derive a transmission parameter based on a comparison of the slot transmit power and the average transmit power.

In some embodiments, a method is implemented at a base station for controlling a modified link adaptation process of a wireless device. The base station determines one or more controlling parameters for controlling the modified link adaptation process at the wireless device. The one or more controlling parameters are then transmitted to the wireless device for use in modifying the link adaptation process.

In some embodiments, a base station configured to control a modified link adaptation process of a wireless device is disclosed. The base station comprises a transceiver for transmitting data and control signals to the wireless device. The base station also comprises a processing circuit for determining one or more controlling parameters. The controlling parameters are transmitted to the wireless device and used by the wireless device to modify a link adaptation process.

DETAILED DESCRIPTION

Figure 1:
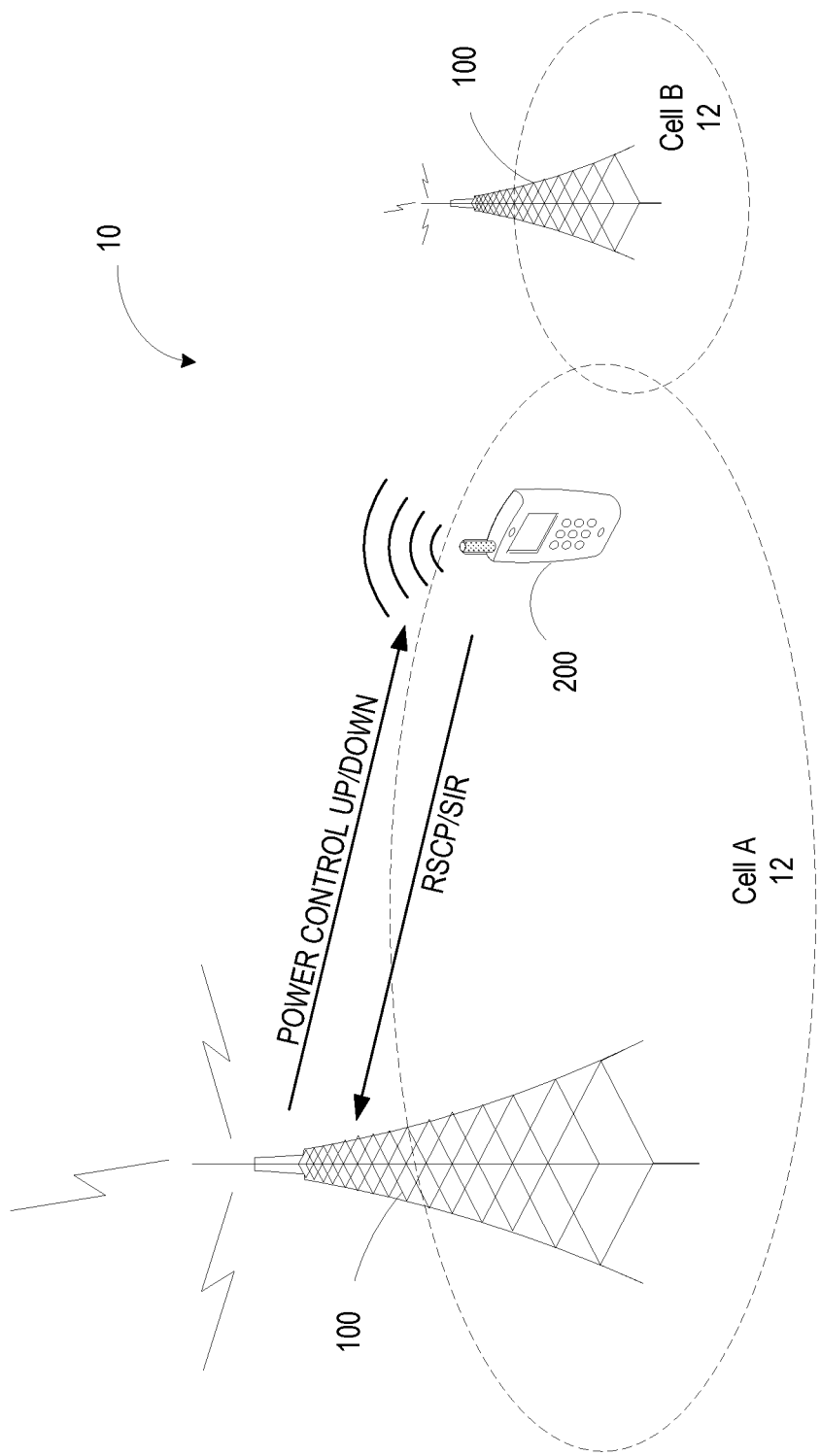
FIG. 1 illustrates an exemplary wireless communication network implementing inner loop power control.

Referring now to the drawings, the present invention will be described in the context of a wireless communication network 10 implementing High Speed Packet Access (HSPA) services. The wireless communication network may, for example, operate according to the Wideband Code Division Multiple Access (WCDMA) standard, Long Term Evolution (LTE) standard, or other standard providing HSPA services. The wireless communication network 10 comprises a plurality of base stations 100 providing service in respective cells 12 of the wireless communication network. The base stations 100 are sometimes referred to as NodeBs (NBs), Evolved NodeBs (eNBs), or access nodes.

FIG. 1 illustrates two cells 12, denoted as Cell A and Cell B, served by respective base stations 100. A wireless device 200 is connected to the base station 100 in Cell A. The base station 100 in Cell A receives uplink transmissions from the wireless device 200 on an uplink channel, for example, a Dedicated Packet Control Channel (DPCCH) in WCDMA systems, and implements closed loop power control to maintain the signal level at the base station at a desired level. The signal level of the received signal may be measured as Signal to Interference Ratio (SIR) or Received Signal Code Power (RSCP). In one embodiment, the base station 100 measures the SIR of the received signal, compares the measured SIR to a SIR target, and adjusts the transmit power of the wireless device 200 depending on the comparison. When the SIR is above the SIR target, the base station 100 sends a down command and the wireless device 200 decreases its transmit power by one step. When the SIR is below the SIR target, the base station 100 sends an up command and the wireless device 200, which increases its transmit power by one step. The base station 100 also implements outer loop power control to adjust the SIR target for the inner loop power control mechanism to maintain a desired performance criterion, such as a desired Frame Error Rate (FER).

When the wireless device 200 experiences fast fading, the received signal power will deteriorate rapidly, and the base station 100 will increase the transmit power of the wireless device 200 to maintain the desired signal level at the base station 100. Fast fading refers to the phenomenon in which the time scale of the variation of the radio condition is small compared to the time scale of the application utilizing the channel.

Figure 2:
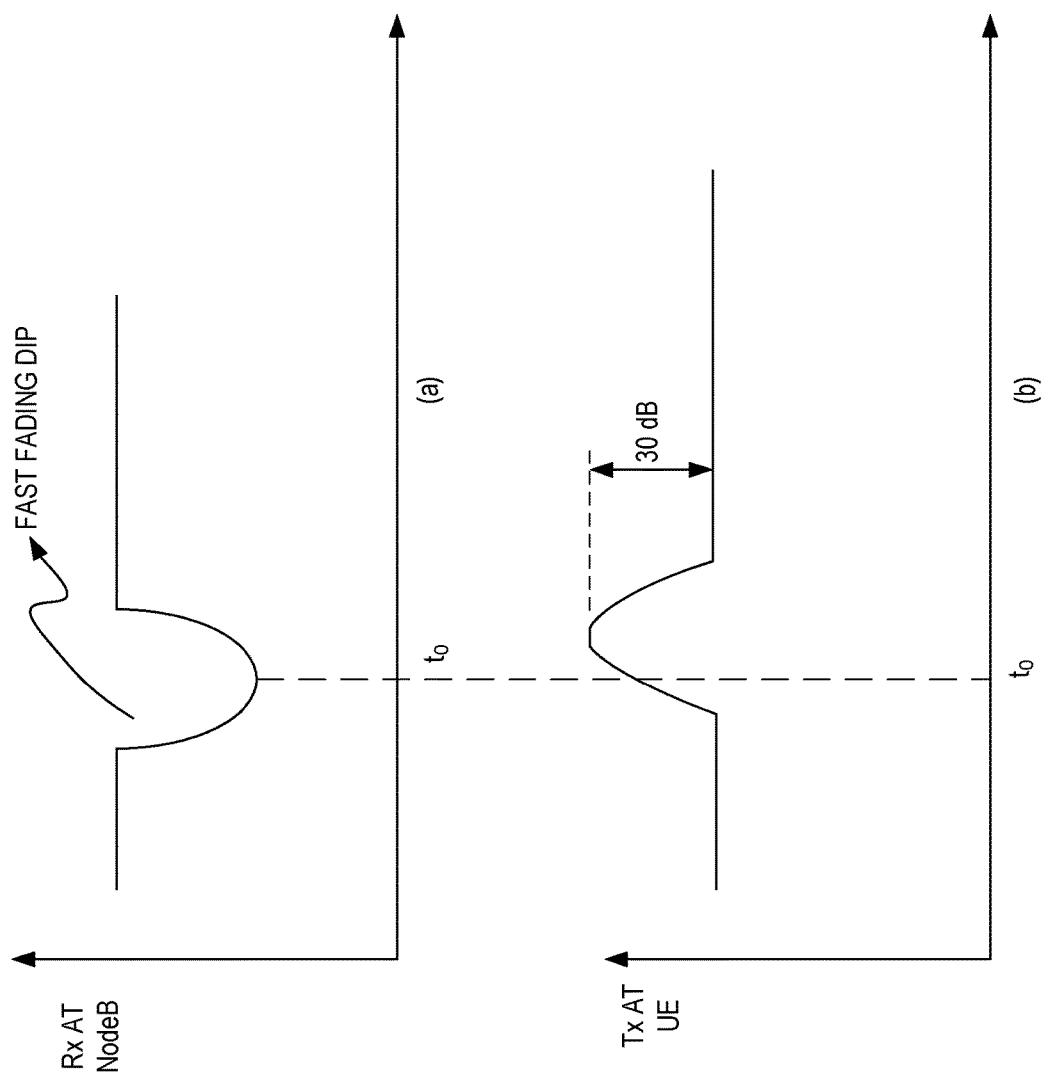
FIG. 2 illustrates a link adaptation process in which a fast fading dip detected by a base station and a fast fading compensation implemented by a wireless device.

FIG. 2 illustrates how inner loop power control compensates for path loss due to fast fading. FIG. 2(*a*) illustrates the received signal strength at the base station 100. FIG. 2(*b*) illustrates the transmit power of the wireless device 200. In FIG. 2(*a*), a fast fading dip takes place at time $t_0$. In some embodiments, the dip in the received signal power may be detected using SIR measurements or RSCP measurements. As the received signal power drops, the measured SIR also drops and the base station 100 sends power up commands to the wireless device 200 to compensate for the path loss due to fast fading. Upon receipt of the power up commands received from the base station 100, the wireless device 200 increases its transmit power to counteract the fast fading. FIG. 2(*b*) illustrates how the transmit power of the wireless device 200 changes with time. The increase of transmit power occurs at a time slightly later than $t_0$. The increased transmit power compensates the path loss due to fast fading. The signal power received at the base station 100 returns to the pre fast-fading-dip level as shown in FIG. 2(*b*).

When the transmit power of the wireless device 200 is increased, the interference on the neighboring cell increases as well. Thus, during fast fading events, the uplink transmissions from the wireless device 200 may interfere with the radio communication in neighboring cells. The transmit power of the wireless device 200 may be increased as much as 30 dB during the fading event, which would generate strong interference in the neighboring cell. In exemplary embodiments of the present disclosure, the wireless device 200 may be configured to limit the transmit power during fast fading event to mitigate interference caused by the wireless device 200. In some embodiments, the wireless device 200 calculates a slot transmit power for an uplink transmission based on the directions or commands from the base station 100. The wireless device 200 compares the calculated slot transmit power to an average transmit power of the wireless device 200 over a predetermined period. Based on the comparison, the wireless device 200 adjusts a transmission parameter to reduce the required slot transmit power to avoid creating excessive interference. Under normal conditions, the wireless device 200 uses the calculated slot transmit power for its uplink transmission. During a fast fading event, the wireless device 200 uses an adjusted slot transmit power.

Figure 3:
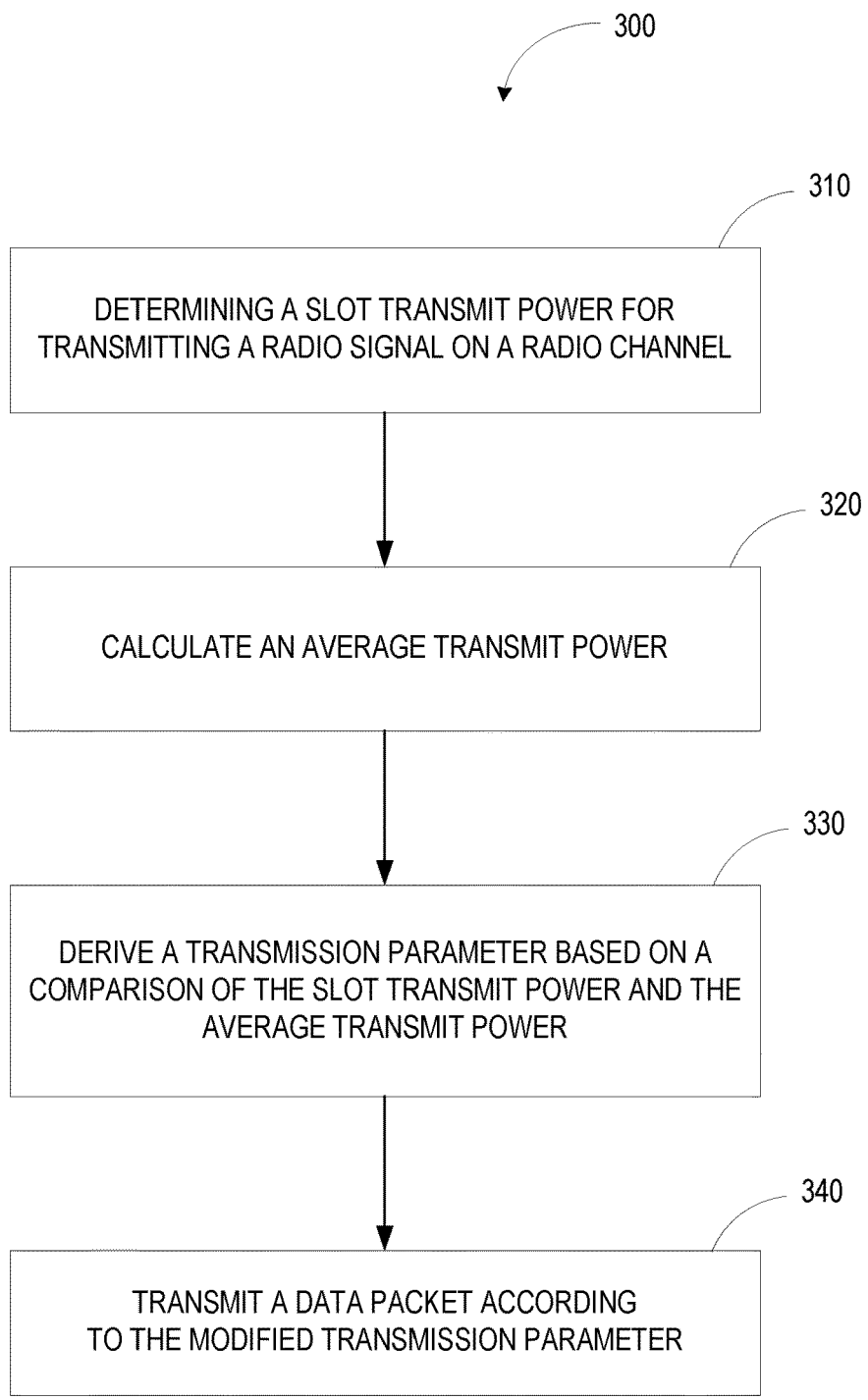
FIG. 3 illustrates an exemplary method of modifying a link adaptation process at a wireless device.

FIG. 3 illustrates an exemplary method implemented at the wireless device 200 for modifying a normal link adaptation process to limit interference during fast fading events. The modified link adaptation process may be used to limit a fast fading compensation. In FIG. 3, the wireless device 200 calculates a slot transmit power for transmitting a radio signal on a radio channel (Step 310), and calculates an average transmit power (Step 320). The wireless device 200 then derives a transmission parameter based on a comparison of the slot transmit power and the average transmit power (Step 330). The transmission parameter is used by the wireless device 200 to transmit a data packet (Step 340).

To determine an average transmit power, the wireless device 200 filters its transmit power on an uplink Dedicated Packet Control Channel (DPCCH). In one embodiment, the wireless device 200 calculates a filtered transmit power as follows:

$$P_{TX\_filter}(n)=\alpha*P_{TX\_filter}(n-1)+(1-\alpha)*P_{TX\_measured}(n), \quad \text{Eq (1)}$$

where $P_{TX\_filter}(n)$ represents the filtered DPCCH transmit power at time interval n. $P_{TX\_filter}(n-1)$ represents the filtered DPCCH transmit power at time interval n−1. $P_{TX\_measured}(n)$ represents the measured DPCCH transmit power at time interval n. The weighting factor $\alpha$ determines the length of the filter. The larger the weighting factor $\alpha$ is, the longer the length of the filter becomes. The weighting factor $\alpha$ may be determined by the base station 100 and signaled to the wireless device 200 over a control channel. The weighting factor $\alpha$ may be broadcast to the wireless device 200. Alternatively, the weighting factor $\alpha$ may be determined and signaled by a radio network controller (RNC) via Radio Resource Control (RRC) signaling. Alternatively, the weighting factor $\alpha$ may be hard-coded in the wireless device 200. The filtered transmit power at time interval n, $P_{TX\_filter}(n)$, represents an average transmit power.

The wireless device 200 compares the filtered transmit power at time interval n with the calculated slot transmit as determined by inner loop power control to detect an increase in the slot transmit power. For example, the wireless device 200 may calculate a transmit power ratio $R_{transmit\_power}$ according to:

$$R_{transmit\_power} = \frac{P_{slot\_transmit\_power}}{P_{TX\_filter}(n)} \quad \text{Eq. (2)}$$

The transmit power ratio $R_{transmit\_power}$ given by Eq. (2) reflects how much the slot transmit power deviates from the average transmit power. The wireless device 200 compares the transmit power ratio $R_{transmit\_power}$ to a threshold. Based on the comparison, the wireless device 200 determines whether to modify a normal link adaptation process and apply a restriction on the fast fading compensation. For example, the wireless device 200 may compute a new transmission parameter based on this ratio.

There are several different approaches that can be used to limit the interference that would otherwise occur in response to a fast fading dip. In one approach, the wireless device 200 modifies a normal link adaptation process by reducing or limiting the data rate/transport format determined by the normal link adaptation process. The data rate/transport format may be a data rate/transport format on a data channel, e.g., an Enhanced Data Packet Data Channel (E-DPDCH). Limiting the data rate means that fewer bits will be transmitted reducing the total interference towards neighboring cells. In another approach, the wireless device 200 reduces or limits the total energy or power used for data transmission on an E-DPDCH. Both approaches are explained in detail below.

In some embodiments, the wireless device 200 adjusts the data rate for the uplink transmission in order to limit the transmit power increase that would have occurred during a normal link adaptation process. To adjust the data rate, the wireless device 100 calculates a rate correction factor based on the transmit power ratio $R_{transmit\_power}$ and uses the rate correction factor CF to calculate the data rate/transport format for the uplink transmission. The rate correction factor CF may be calculated according to:

$$CF = \max(1; k * R_{transmit\_power}).\qquad\text{Eq. (3)}$$

The data rate R may then be calculated according to:

$$R = \max\left(\frac{R_{normal}}{CF}; \min\_rate\right),\qquad\text{Eq. (4)}$$

where $R_{normal}$ is the normal data rate that would have been selected without compensation for fast fading, min_rate is the lowest data rate that is allowable, and k is a constant used to scale the ratio of the slot transmit power to the average transmit power. The constant k controls the extent to which the data rate in the transport format should be restricted. It is noted that in general higher data rate means higher transmit power. The constant k limits the fast fading compensation. The data rate R may be used to select the transport format. Both the min_rate and the constant k may be provided to the wireless device 200 by the base station 100 over a control channel. The two parameters can be broadcast to the wireless device 100. Alternatively, a radio network controller may determine the min_rate and constant k and provide them to the wireless device 100 via RRC signaling. In some embodiments, these two parameters can also be hardcoded in the wireless device 200 as well.

In some embodiments, the rate correction factor CF may be provided to the transport format selection function for the wireless device 200. In this case, the selection function uses the rate correction factor CF as a scaling factor to scale the available power headroom. The scaled available power headroom is then used to perform a data rate/transport format selection. In one exemplary scenario, when there is an increase in the ratio of the slot transmit power to the average transmit power, the scaling factor increases the available power headroom. More reserved power headroom restricts the maximum transmit power available for the wireless device 200. This in turn would limit the data rate in the selected transport format.

In other embodiments, rather than adjusting the data rate/transport format, the wireless device 200 uses the transmit power ratio $R_{transmit\_power}$ to directly adjust the transmit power on the Enhanced Packet Data Channel (E-DPCCH). To adjust the transmit power for the E-DPCCH, the wireless device 100 calculates a power correction factor based on the transmit power ratio $R_{transmit\_power}$. The power correction factor PCF may be calculated according to:

$$PCF = \max\left(\min\left(1; y * \frac{1}{R_{transmit\_power}}\right); \min\_PCF\right),\qquad\text{Eq. (5)}$$

where y is a constant that controls how much the E-DPCCH transmit power should be restricted, and min_PCF represents the smallest value the power correction factor PCF can take. min_PCF also reflects the largest power reduction that the wireless device 200 is allowed to make when restricting the change in E-DPCCH transmit power. The modified E-DPCCH transmit power may then be calculated according to:

$$P_{E\text{-}DPCCH} = PCF * P_{normal\_E\text{-}DPCCH},\qquad\text{Eq. (6)}$$

where $P_{normal\_E\text{-}DPCCH}$ represents the power level that should be selected without any fast fading power limitation.

Figure 4:
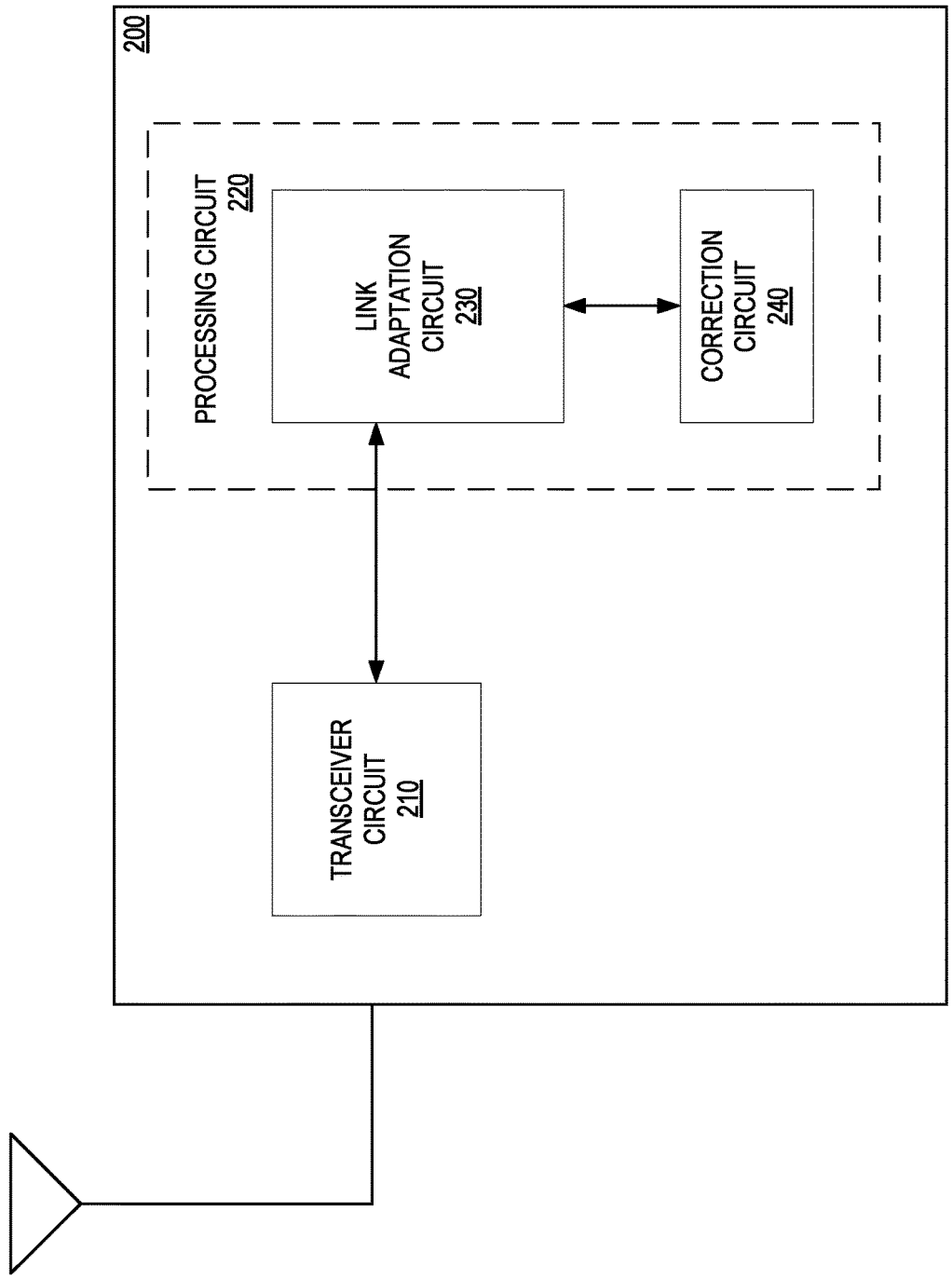
FIG. 4 illustrates an exemplary wireless device configured to modify a link adaptation process.

FIG. 4 illustrates an exemplary wireless device 200 configured to modify a link adaptation process as herein described. The wireless device 200 comprises a transceiver circuit 210 and a processing circuit 220. The transceiver circuit 210 is configured to receive and transmit signals to and from a base station, e.g., the base station 100. The processing circuit 220 is configured to modify a link adaptation process. The processing circuit 220 may comprise a link adaptation circuit 230 and a correction circuit 240. The link adaptation circuit 230 is configured to select a normal transport format for the wireless device's uplink transmissions. In some scenarios, the normal transport format reflects a fast fading compensation. The correction circuit 240 is configured to modify the transport format selected by the link adaptation circuit 230. The correction circuit 240 is configured to determine a slot transmit power for transmitting a radio signal on a radio channel. The correction circuit 240 calculates an average transmit power and derives a transmission parameter based on a comparison of the slot transmit power and the average transmit power. The derived transmission parameter is used by the wireless device 200 to transmit a data packet.

Figure 5:
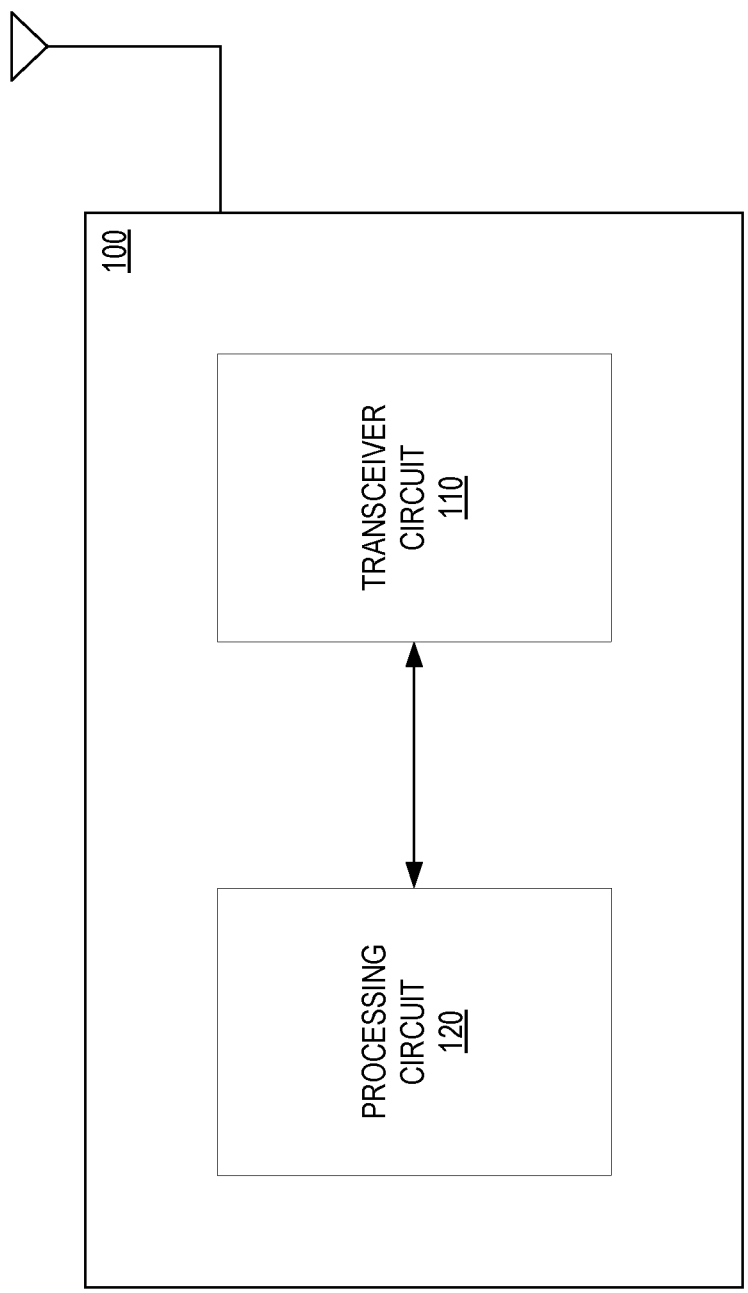
FIG. 5 illustrates an exemplary method implemented at a base station for controlling a modified link adaptation process of a wireless device.

In some embodiments, the base station 100 may set conditions on when the wireless device 200 can restrict a fast fading compensation. For example, the base station 100 may decide that the wireless device 200 only applies a fast fading restriction when the measured path loss of an uplink transmission is larger than a threshold. Alternatively, the wireless device 200 may apply a fast fading restriction only when the wireless device 200 is transmitting above a pre-determined minimum power level. The path loss threshold and the pre-determined minimum power level may be transmitted to the wireless device 200 by the base station 100. These two parameters may be broadcast to the wireless device 200. Alternatively, a radio network controller may determine and transmit the path loss threshold and the pre-determined minimum power level to the wireless device 200 via RRC signaling. The path loss threshold and the pre-determined power level may be hard-coded in the wireless device 200 as well. As described above, the modified transmit power may represent a fast fading restriction imposed by the wireless device 200 to reduce or limit the increase of transmit power for fast fading compensation. In a fast fading restriction, one or more controlling parameters determine how large and/or when a fast fading restriction should be applied. For example, the path loss threshold, the pre-determined minimum power level, min_rate, constant k, min_PCF and constant y are all controlling parameters the wireless device 200 relies on to modify a normal link adaptation process. Those controlling parameters are determined and transmitted to the wireless device 200 by a radio network, either from a RNC node (via a base station) or directly from a base station, e.g., the base station 100. An exemplary base station 100 configured to control a modified link adaptation process of the wireless device 200 is illustrated in FIG. 5.

The base station 100 comprises a transceiver circuit 110 and a processing circuit 120. The transceiver circuit 110 is configured to transmit data and control signals to the wireless device 200. The processing circuit 120 is configured to determine one or more controlling parameters and transmit the one or more controlling parameters for the wireless device 200 to use in modifying a link adaptation process. The one or more controlling parameters may be transmitted to the wireless device 200 via RRC signaling or broadcasting.

Figure 6:
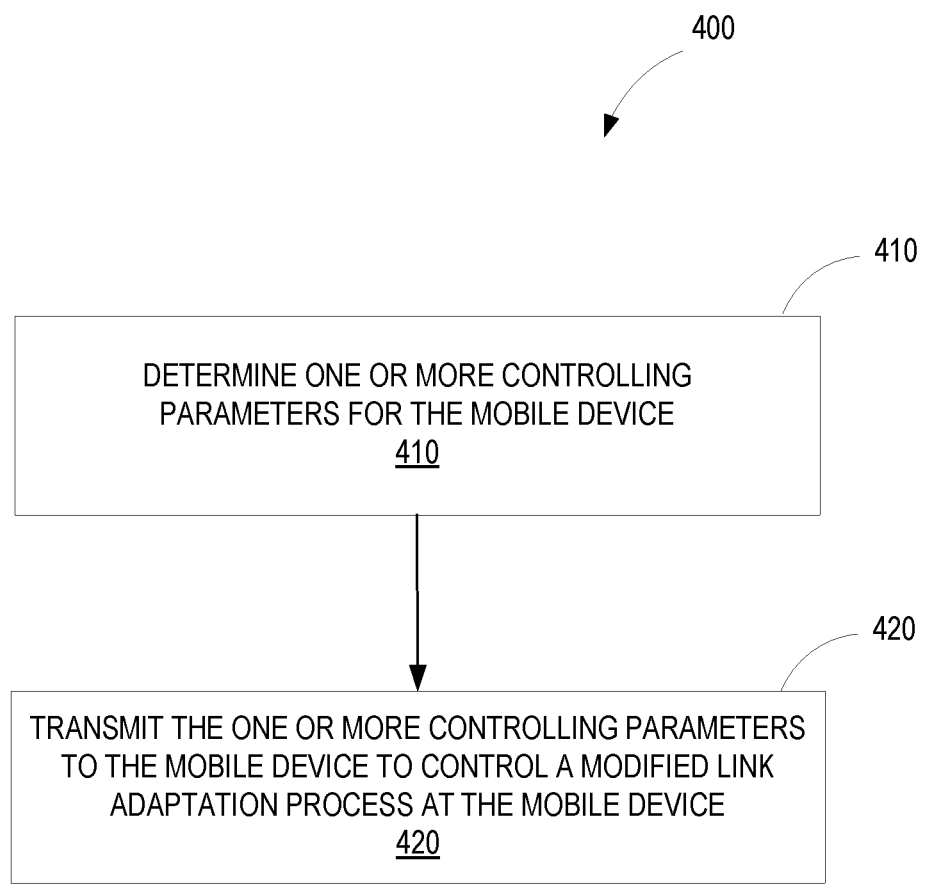
FIG. 6 illustrates an exemplary base station configured to control a modified link adaptation process of a wireless device.

FIG. 6 illustrates an exemplary method 400 implemented at the base station 100 for controlling a modified link adaptation process at the wireless device 200. The base station 100 determines one or more controlling parameters for the wireless device (Step 410). The base station 100 then transmits the one or more controlling parameters to the wireless device to control a modified link adaptation process at the wireless device 200 (Step 420). Examples of the one or more controlling parameters include the path loss threshold, the pre-determined minimum power level, min_rate, constant k, min_PCF, and constant y, all described in detail in the above discussion.

It is noted that some or all of the above mentioned controlling parameters may be hardcoded in the wireless device 200 as well.

It is also noted that a radio network controller may be configured to determine the one or more controlling parameters for the wireless device 200 and transmit the one or more controlling parameters to the wireless device 200 via RRC signaling. The radio network controller may comprise a network interface for communicating with the base station 100 and a processing circuit for determining the one or more controlling parameters. The one or more controlling parameters are sent to the base station 100 via the network interface for transmitting to the wireless device 200.

It is further noted that in some embodiments, other types of network nodes, such as eNBs, NodeBs, access nodes, etc., may be configured to control the wireless device 200 to modify a link adaptation process at the wireless device 200.

When a fast fading restriction is applied, the modified link adaptation process does not fully compensate for fast fading dips. This may result in a lower data transmission rate. Or it may lead to increased re-transmission attempts. The effect of both consequences is that some data may be transmitted at a different time using different resources, for example, when the fast fading has subsided. The wireless device 200 avoids inefficient resource-utilization during fast-fading and arranges data transmission at another time when the channel conditions have improved. Another advantage of fast fading restriction is reduced interference level as experienced by neighboring cells during fast fading in cell A, which would lead to an improved overall system performance, especially in a multi-user multi-cell scenario. Fast fading restriction also lowers or limits the transmit power of the wireless device 200, allowing the wireless device 200 to conserve battery power and extend the battery life.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented at a wireless device, for modifying a link adaption process for an uplink transmission from the wireless device, the method comprising:
   determining a slot transmit power for transmitting a radio signal on a radio channel;
   calculating an average transmit power;
   deriving a data rate based on a comparison of the slot transmit power and the average transmit power;
   wherein the deriving comprises:
      determining a normal data rate that does not compensate for fast fading;
      computing a ratio of the slot transmit power to the average transmit power;
      computing a rate correction factor based on the ratio; and
      modifying the normal data rate using the rate correction factor when the ratio is larger than a threshold; and
   transmitting a data packet in accordance with the derived data rate.

2. The method of claim 1, wherein the data packet is transmitted on an uplink Dedicated Physical Control Channel (DPCCH).

3. The method of claim 1, wherein the modified data rate, if smaller than a minimum data rate, is set to the minimum data rate.

4. The method of claim 1, wherein computing the rate correction factor comprises:
   receiving a scaling factor from a base station for scaling the ratio of a transmit power to the average transmit power; and
   computing the rate correction factor by scaling the ratio by the scaling factor.

5. The method of claim 4, wherein the correction factor compensates for fast fading experienced by the wireless device.

6. A wireless device configured to modify a link adaptation process for an uplink transmission from the wireless device, the wireless device comprising:
   a transceiver for receiving and transmitting signals; and
   a processing circuit for modifying the link adaptation process, the processing circuit configured to:
      determine a slot transmit power for transmitting a radio signal on a radio channel;
      calculate an average transmit power;
      derive a data rate based on a comparison of the slot transmit power and the average transmit power by:
         determining a normal data rate that does not compensate for fast fading
         computing a ratio of the slot transmit power to the average transmit power;
         computing a rate correction factor based on the ratio; and
         modifying the normal data rate using the rate correction factor when the ratio is larger than a threshold; and
      cause the transceiver to transmit a data packet in accordance with the derived data rate.

7. The wireless device of claim 6, wherein the data packet is transmitted on an uplink Dedicated Physical Control Channel (DPCCH).

8. The wireless device of claim 6, wherein the modified data rate, if smaller than a minimum data rate, is set to the minimum data rate.

9. A method for controlling a modified link adaptation process of a wireless device, the method comprising:
   determining one or more controlling parameters for the wireless device, wherein the one or more controlling parameters comprise a factor for scaling at the wireless device a ratio of a slot transmit power to an average transmit power, wherein the factor restricts the amount of modification the wireless device can modify a normal transmission parameter; and
   transmitting the one or more controlling parameters to the wireless device to control the modified link adaptation process at the wireless device.

10. The method of claim 9, wherein the one or more transmission parameters are transmitted to the wireless device via Radio Resource Control (RRC) signaling or broadcasting.

11. The method of claim 9, wherein the factor restricts the amount of modification the wireless device can modify the normal transmission parameter by scaling the ratio to calculate a power correction factor that restricts modification of a transmit power level at the wireless device.

12. The method of claim 9, wherein the factor restricts the amount of modification the wireless device can modify the normal transmission parameter by scaling the ratio to calculate a rate correction factor that restricts modification of a data rate at the wireless device.

13. The method of claim 9, wherein the controlling parameters further comprise at least two factors for scaling at the wireless device a respective ratio of the slot transmit power to the average transmit power, the two factors used to modify at the wireless device a data rate and a transmit power level, respectively.

14. A base station configured to control a modified link adaptation process at a wireless device, the base station comprising:
   a transceiver for transmitting data and control signals to the wireless device; and
   a processing circuit configured to:
      determine one or more controlling parameters, wherein the one or more controlling parameters comprise a factor for scaling at the wireless device a ratio of a slot transmit power to an average transmit power, wherein the factor restricts the amount of modification the wireless device can modify a normal transmission parameter; and
      cause the transceiver to transmit the one or more controlling parameters to control the modified link adaption process at the wireless device.

15. The base station of claim 14, wherein the one or more transmission parameters are transmitted to the wireless device via signaling.

* * * * *